(12) United States Patent
Keranen et al.

(10) Patent No.: US 10,341,091 B2
(45) Date of Patent: Jul. 2, 2019

(54) SECURE MEMORY STORAGE

(71) Applicant: Bittium Wireless Oy, Oulu (FI)

(72) Inventors: Vesa Keranen, Oulu (FI); Kari Nalli, Oulu (FI)

(73) Assignee: BITTIUM WIRELESS OY, Oulu (FI)

( * ) Notice: Subject to any disclaimer, the term of this patent is extended or adjusted under 35 U.S.C. 154(b) by 104 days.

(21) Appl. No.: 14/996,529

(22) Filed: Jan. 15, 2016

(65) Prior Publication Data

US 2017/0206174 A1    Jul. 20, 2017

(51) Int. Cl.
| | |
|---|---|
| *H04L 9/06* | (2006.01) |
| *H04L 9/32* | (2006.01) |
| *G06F 21/62* | (2013.01) |
| *H04L 9/08* | (2006.01) |

(52) U.S. Cl.
CPC ........ *H04L 9/0643* (2013.01); *G06F 21/6209* (2013.01); *H04L 9/0877* (2013.01); *H04L 9/3226* (2013.01)

(58) Field of Classification Search
CPC ... G06F 12/1408; G06F 21/602; H04L 9/0631
USPC .......................................................... 713/193
See application file for complete search history.

(56) References Cited

U.S. PATENT DOCUMENTS

| | | | | | |
|---|---|---|---|---|---|
| 5,497,421 | A | * | 3/1996 | Kaufman ............... | G06F 21/335 380/28 |
| 5,764,887 | A | * | 6/1998 | Kells ..................... | G06F 21/445 713/156 |
| 5,999,711 | A | * | 12/1999 | Misra ....................... | G06F 21/33 719/310 |
| 6,052,785 | A | * | 4/2000 | Lin .......................... | G06F 21/33 709/225 |
| 7,571,467 | B1 | * | 8/2009 | Priestley ............... | G06Q 20/206 380/277 |
| 2003/0133575 | A1 | * | 7/2003 | Challener ............... | G06F 21/57 380/277 |
| 2007/0121949 | A1 | * | 5/2007 | Eastham ............... | G06F 21/602 380/278 |
| 2007/0130472 | A1 | | 6/2007 | Buer et al. | |
| 2008/0155276 | A1 | * | 6/2008 | Chen ................... | G06F 12/1466 713/193 |
| 2009/0070598 | A1 | * | 3/2009 | Cromer ................. | G06F 21/575 713/193 |

(Continued)

FOREIGN PATENT DOCUMENTS

WO     2009123631 A1    10/2009

OTHER PUBLICATIONS

European Search Report, Application No. EP 16 15 1422, dated Apr. 6, 2016.

*Primary Examiner* — Dant B Shaifer Harriman
(74) *Attorney, Agent, or Firm* — Fisherbroyles, LLP

(57) ABSTRACT

A solution for securing a memory storage is provided. A user password is received. A random number is read from Trusted Platform Module. Values of one or more Platform Configuration Registers of the Trusted Platform Module are received and a blob is created using the random number and the values from the one or more registers and the user password. The blob is encrypted in the Trusted Platform Module and re-encrypted in a Trusted Execution Environment execution mode of the apparatus utilizing hardware specific key and the user password and the re-encrypted blob is stored.

11 Claims, 2 Drawing Sheets

(56) References Cited

U.S. PATENT DOCUMENTS

| | | | | |
|---|---|---|---|---|
| 2011/0239283 A1* | 9/2011 | Chern | ............... | G06F 21/33 |
| | | | | 726/6 |
| 2011/0252243 A1* | 10/2011 | Brouwer | ............... | H04L 9/0838 |
| | | | | 713/189 |
| 2012/0297200 A1* | 11/2012 | Thom | ............... | G06F 21/57 |
| | | | | 713/189 |

* cited by examiner

SECURE MEMORY STORAGE

BACKGROUND

Field

The exemplary and non-limiting embodiments of the invention relate generally to secure memory storages.

Description of the Related Art

The following description of background art may include insights, discoveries, understandings or disclosures, or associations together with disclosures not known to the relevant art prior to the present invention but provided by the invention. Some of such contributions of the invention may be specifically pointed out below, whereas other such contributions of the invention will be apparent from their context.

Nowadays information is stored often in digital form. Digital information storages are of many forms. Typically they are hard discs, or flash drives, for example. These memory storages are of many sizes and they may be used in a large variety of devices, including personal computers, mobile phones, tablets, laptops or removable drives.

As digital information is easy to copy and transfer from storage to another, security has become an important issue when storages and methods for accessing storages are being developed. This applies to all types of storages but especially storages which are located or attached to mobile devices which users carry with themselves. As the physical location of the storage is unsecure care must be taken to ensure that data on the storage may be accessed only by a user entitled to access it.

It is known to utilize cryptography to protect data on memory storages. The data is encrypted and may be accessed only by users which know how to decrypt the data. User passwords and different encryption methods have been used to provide security. However, a satisfactory solution which would be strongly resistant to attacks has not yet been solved.

SUMMARY

An object of the present invention is to provide a method and an apparatus for implementing securing a memory storage that offers hardware backed solution to protect data on a memory storage.

According to an aspect of the present invention, there is provided a method of securing a memory storage in an apparatus, the method comprising: receiving user password; reading a random number from Trusted Platform Module, TPM; receiving values of one or more Platform Configuration Registers of the Trusted Platform Module; creating a blob using the random number and the values from the one or more registers and the user password; encrypting the blob in the Trusted Platform Module; re-encrypting the blob in a Trusted Execution Environment, TEE, execution mode of the apparatus utilizing hardware specific key and the user password; and storing the re-encrypted blob.

According to another aspect of the present invention, there is provided an apparatus comprising: a trusted platform module, TPM, a processor comprising an open execution mode and a Trusted Execution Environment, TEE, execution mode, and a memory storage; wherein the processor is in the open execution mode configured to receive user password; request a random number from Trusted Platform Module, TPM; receive values of one or more Platform Configuration Registers of the Trusted Platform Module; create a blob using the random number and the values from the one or more registers and the user password; request the Trusted Platform Module to encrypt the blob; request the Trusted Execution Environment execution mode of the processor to re-encrypt the blob utilizing hardware specific key and the user password; and store the re-encrypted blob.

Some embodiments of the invention are disclosed in the dependent claims.

BRIEF DESCRIPTION OF THE DRAWINGS

In the following the invention will be described in greater detail by means of preferred embodiments with reference to the attached drawings, in which.

DETAILED DESCRIPTION

Cryptography has been under extensive study especially since the development of computers. Modern cryptography relies on complex mathematical algorithms which are used to encrypt the data to be protected. Typically the algorithms utilise a key or keys which may be formed from a random salt and user generated passwords.

Utilising cryptography is always a compromise between complexity, speed, user friendliness and safety. Especially in mobile devices which have limited processing power and speed requirements due to user friendliness and on the other hand high security requirements the design of suitable protection scheme is a challenging task.

In present solutions for cryptography in a mobile device, user data and cryptographic keys are stored in the device in an encrypted form. The cryptographic keys are generated by utilizing a user password, random salt and predetermined key derivation functions. The cryptographic keys generated from user password are vulnerable to brute force attacks. The cryptographic keys are generated totally on a user side and stored in an encrypted form. A user side of a device is an open memory area, on which all the applications running in the device are executed. This method may introduce a security risk e.g. in terms of revealing the keys. The method does not meet the security standards introduced by many governments.

The current method provides a password verification support used in the screen lock and a storage key encryption that utilizes a sha1-hash (Secure Hash Algorithm-1), a user password and the salt value stored to a database in the device. This solution is vulnerable to pre-computed attacks such as brute force in case the password hash file and the salt value from the database get stolen. It's also noticeable that current method in which keys are encrypted with the key generated from the user password does not bind the keys to a particular device, which leads to the situation in which the keys can be removed to other devices to get them broken.

Figure 1:
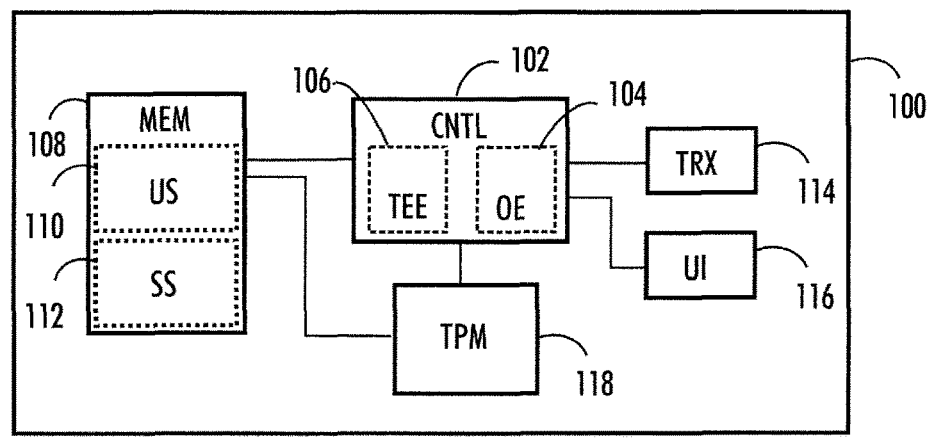
FIG. 1 illustrates a simplified example of an apparatus in which some embodiments of the invention may be applied.

FIG. 1 illustrates a simplified example of an apparatus 100 in which some embodiments of the invention may be applied. In some embodiments, the apparatus may be a mobile device or a part of a mobile device. The mobile device may be a mobile phone, a tablet, a laptop, a personal digital assistant (PDA), e-reading device, for example. The apparatus may include wireless mobile communication device operating with or without a subscriber identification module (SIM).

It should be understood that the apparatus is depicted herein as an example illustrating some embodiments. It is apparent to a person skilled in the art that the apparatus may also comprise other functions and/or structures and not all described functions and structures are required. Although the apparatus has been depicted as one entity, different modules and memory may be implemented in one or more physical or logical entities.

The apparatus 100 of the example includes a control circuitry 102 configured to control at least part of the operation of the apparatus. The control circuitry may be a processor. In an embodiment, the control circuitry comprises two separate sections or modes, an open execution mode 104 and a Trusted Execution Environment (TEE) execution mode 106. The open execution mode is a mode where normal operation system and user applications are run. Access to a predetermined subset of the physical resources of the apparatus may be available. The Trusted Execution Environment execution mode is a secure isolated execution environment which may provide access to different resources compared to open mode. Data, resources and applications of the Trusted Execution Environment execution mode are not visible or accessible by the open execution mode. In an embodiment, the Trusted Execution Environment execution mode stores a hardware specific key, which is different for each apparatus or each control circuitry. The key may be a secondary hardware key, SHK.

The apparatus may further comprise a memory 108 for storing data and applications. The memory 108 may comprise an open user side 110, where all user applications are executed. Typically there is no encryption used on the user side 110. In addition, the memory may comprise a secure memory storage 112. The secure memory storage may be protected by unauthorised access using encryption.

In some embodiments the apparatus 100 may comprise a transceiver 114. The transceiver is operationally connected to the control circuitry 102. It may be connected to an antenna arrangement comprising one more antenna elements or antennas (not shown).

The control circuitry 102 is configured to execute one or more applications. The applications may be stored in the memory 108.

In some embodiments the apparatus 100 may further comprise an interface 116 operationally connected to the control circuitry 102. The interface may connect the apparatus to other respective apparatuses. The interface may comprise user interface with which the user of the apparatus may interact with the apparatus.

In an embodiment, the apparatus may further comprise a Trusted Platform Module, TPM, circuitry 118. The Trusted Platform Module 118 is a separate circuitry or a computer chip such as a microcontroller that can securely store data used in authentication. The data may comprise passwords, certificates, or cryptographic keys. In general, the TPM circuitry may be any circuitry configured to encrypt data protected with a user password. The TPM circuitry may comprise one or more special registers such as a platform configuration register (PCR) to store information. The number of registers may be 24, for example. In an embodiment, two of the TPM circuitry registers, PCR0 and PCR1 are utilised. The number of registers used is merely an example. The registers may comprise data which is utilised in encryption. In an embodiment, the data is stored on the registers at the time when the apparatus is turned on. The data may be unchangeable by the user and it may be based on hash values which are stored in the apparatus and which are apparatus specific. Several commercial enterprises manufacture TPM circuitries.

In an embodiment, the creation and use of secure memory storage 112 is realised by distributing the cryptographic key generation/verification process and user password verification process between the open user side 104, 110, the Trusted Execution Environment execution mode and TPM circuitry and also bind the cryptographic keys to a particular device and TPM circuitry. The user encryption password is verified in TPM circuitry in combination with the Trusted Execution Environment execution mode. The actual cryptographic key is never stored to the device but instead a derivation key.

Figure 2:
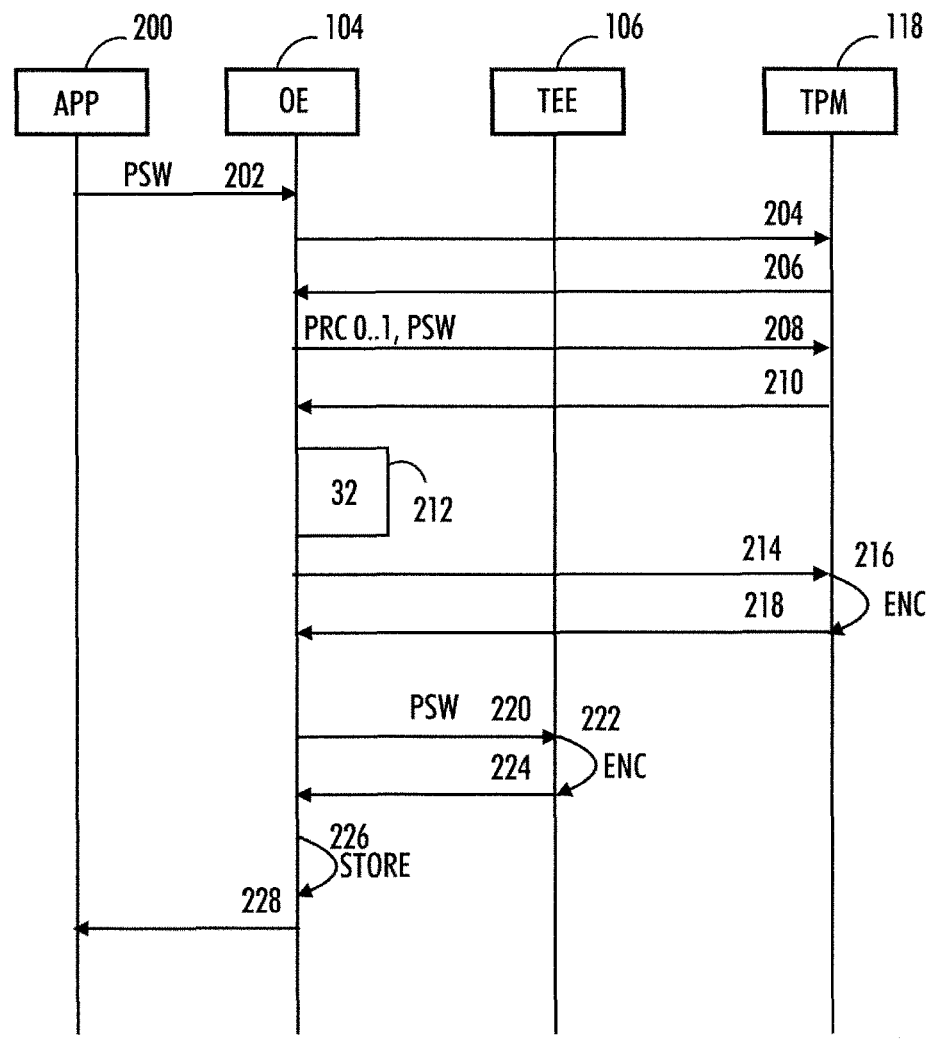
FIGS. 2 and 3 are signalling charts illustrating embodiments.

FIG. 2 is a signalling chart illustrating an embodiment. The example of FIG. 2 illustrates how the secure memory storage 112 is created and prepared for use. FIG. 2 illustrates signalling between application 200 requesting the secure memory storage 112, the open execution mode 104 of the control circuitry 102, the Trusted Execution Environment (TEE) execution mode 106 of the control circuitry 102 and the TPM circuitry 118. Any numerical values (bytes, sizes) are merely illustrative non-limiting examples.

First, an application 200 needing the secure memory storage transmits 202 a user password to the open execution mode 104 of the control circuitry. The password may have been received from the user via the interface 116.

The open execution mode 104 of the control circuitry is configured to request a random number from the TPM circuitry 118. In an embodiment, the random number comprises 32 bytes.

The TMP circuitry is configured to generate the random number and transmit 206 the random number to the open execution mode 104. The random number may be used as a derivation key.

The open execution mode 104 of the control circuitry is configured to request 208 PCR0 and PCR1 register values from the TPM circuitry 118. The circuitry reads the values and transmits 210 them to the open execution mode 104.

Next the open execution mode 104 of the control circuitry is configured to build 212 a blob by assigning the 32 byte random number into the blob and bind the blob to PCR0 and PCR1 register values and the user password. The blob means a Binary Large OBject and it is a collection of binary data stored as a single entity.

The open execution mode 104 of the control circuitry is configured to send 214 the blob to from the TPM circuitry 118 for encryption.

The TPM circuitry 118 encrypts 216 the blob and transmit the encrypted blob to the open execution mode 104. In an embodiment, at this phase the blob comprises the 32 byte random number and total size is 313 bytes.

The numerical size of the blob is merely an example. The actual size depends on many issues, such as the number of the TPM circuitry registers used.

Next, the open execution mode 104 of the control circuitry is configured to send 220 the encrypted blob to the Trusted Execution Environment, TEE, execution mode 106 of the apparatus for re-encryption. In an embodiment, also the user password is sent to the TEE. In an embodiment, the user password is executed through PBDKF-SHA256 (Password-Based Key Derivation Function-Secure Hash Algorithm) algorithm and the result of that is used as a salt for TEE encryption. The salt value derived from the user password may be utilized in AES (Advanced Encryption Standard) encryption and in the key derivation in TEE. In an embodiment, the AES initialization vector (IV-vector) is the results of the salt value, IV=SHA256(salt). The key derivation derives an encryption key from the secondary hardware key SHK and the salt may be one of the input for that. As a result the encryption key is bound in addition of the SHK to the user password.

The Trusted Execution Environment execution mode 106 of the apparatus is configured to re-encrypt 222 the blob utilizing hardware specific key and the user password. The hardware specific key may be the secondary hardware key, SHK. As mentioned, in an embodiment a SHA256(salt) is performed, then an AES (Advanced Encryption Standard) key is generated using hardware specific key and finally AES-CBC (Cipher Block Chaining) encryption is performed. Thus, the encryption is bound to the device and user password. In an embodiment, at this phase total size of the blob is 320 bytes. Again, the numerical size of the blob is merely an example.

The Trusted Execution Environment execution mode 106 sends 224 the re-encrypted blob to the open execution mode 104 of the control circuitry which is configured to store 226 the blob to file system of the apparatus that is not erased during the flashing operation.

The secure memory storage is now ready for use and the application 200 is informed 228.

Figure 3:
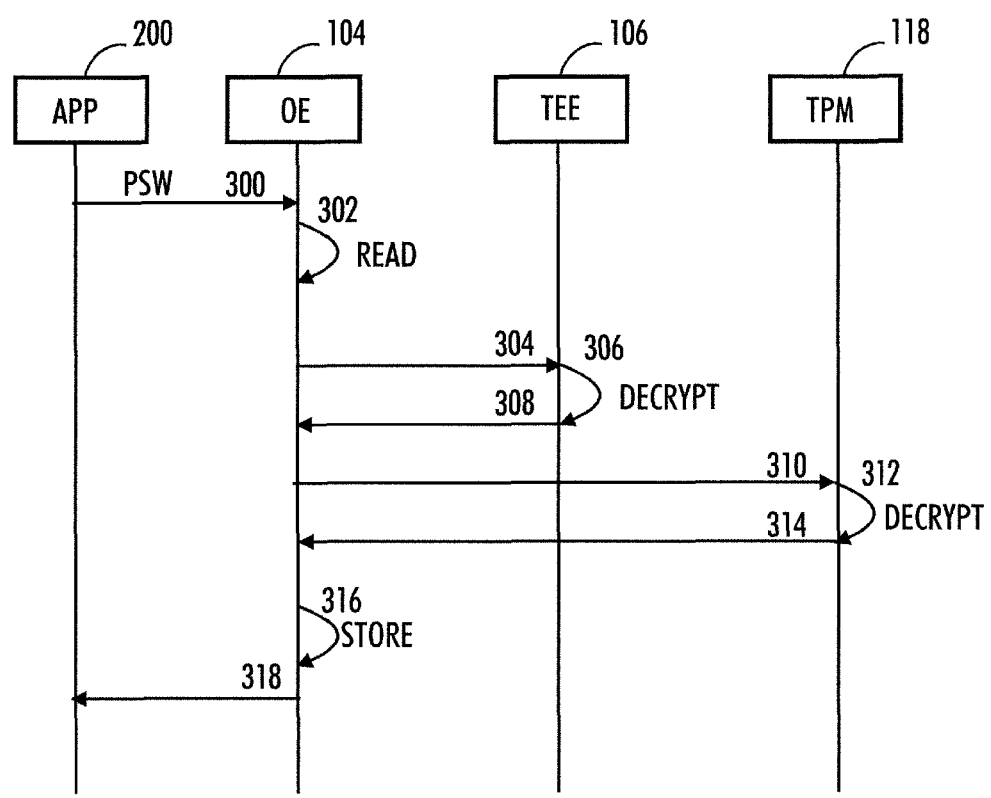

FIG. 3 is another signalling chart illustrating an embodiment. The example of FIG. 3 illustrates how the secure memory storage 112 is opened for use. FIG. 3 illustrates signalling between application 200 requesting the secure memory storage 112, the open execution mode 104 of the control circuitry 102, the Trusted Execution Environment (TEE) execution mode 106 of the control circuitry 102 and the TPM circuitry 118.

First, an application 200 needing access to the secure memory storage transmits 300 a user password to the open execution mode 104 of the control circuitry. The password may have been received from the user via the interface 116.

The open execution mode 104 of the control circuitry is configured to read 302 encrypted blob from the file system of the apparatus.

The open execution mode 104 of the control circuitry is configured to send 304 the encrypted blob to the Trusted Execution Environment (TEE) execution mode 106 of the control circuitry for decrypting.

The Trusted Execution Environment execution mode 106 of the control circuitry is configured to decrypt 306 the blob. A symmetric key is bound to the hardware key SHK and user password. The blob is sent 308 it back to the open execution mode 104.

Next, the open execution mode 104 of the control circuitry is configured to send 310 the blob to the TPM circuitry 118 for second decrypting.

The TPM circuitry 118 decrypts 312 the blob. If the user password is incorrect, the TPM verification fails because the result of the first TEE decryption is incorrect. Otherwise, the result of the decryption, the derivation key, is transmitted 314 the decrypted blob back to the open execution mode 104. In an embodiment, the size of the derivation key is 32 bytes.

The 32 bytes derivation key is kept 316 in the memory as long as the storage is open.

The open execution mode 104 of the control circuitry is configured inform the application 200 that the storage is open and may be used.

If the decrypting is unsuccessful for example due to a wrong password, the open execution mode 104 of the control circuitry is configured to increase the value of a fail counter. The value of the fail counter may in such a case be compared to a given threshold value and the contents of the memory storage deleted if the value of the fail counter is larger than the given threshold value.

When a correct user password is received the fail counter may be reset.

The steps and related functions described in the above and attached figures are in no absolute chronological order, and some of the steps may be performed simultaneously or in an order differing from the given one. Other functions can also be executed between the steps or within the steps. Some of the steps can also be left out or replaced with a corresponding step.

The apparatuses or controllers able to perform the above-described steps may be implemented as an electronic digital computer, or a circuitry which may comprise a working memory (RAM), a central processing unit (CPU), and a system clock. The CPU may comprise a set of registers, an arithmetic logic unit, and a controller. The controller or the circuitry is controlled by a sequence of program instructions transferred to the CPU from the RAM. The controller may contain a number of microinstructions for basic operations. The implementation of microinstructions may vary depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

An embodiment provides a computer program embodied on a distribution medium, comprising program instructions which, when loaded into an electronic apparatus, are configured to control the apparatus to execute the embodiments described above.

The computer program may be in source code form, object code form, or in some intermediate form, and it may be stored in some sort of non-transitory carrier, which may be any entity or device capable of carrying the program. Such carriers include a record medium, computer memory, read-only memory, and a software distribution package, for example. Depending on the processing power needed, the computer program may be executed in a single electronic digital computer or it may be distributed amongst a number of computers.

It will be obvious to a person skilled in the art that, as the technology advances, the inventive concept can be implemented in various ways. The invention and its embodiments are not limited to the examples described above but may vary within the scope of the claims.

What is claimed is:

1. A method of securing a memory storage in a mobile terminal apparatus, the method comprising:
receiving a user password;
reading a random number from a Trusted Platform Module (TPM);
receiving apparatus specific values of one or more Platform Configuration Registers of the Trusted Platform Module;
creating a blob using the random number and the apparatus specific values from the one or more registers and the user password;
encrypting the blob in the Trusted Platform Module;
re-encrypting the encrypted blob in a Trusted Execution Environment (TEE) execution mode of the apparatus utilizing a hardware specific key and the user password; and
storing the re-encrypted blob, the re-encryption further comprising:
generating a salt utilising the encrypted blob;
applying a Secure Hash Algorithm (PBDKF-SHA256) to the salt;
generating an Advanced Encryption Standard key utilising the salt and the hardware specific key; and
encrypting the hardware specific key utilising Advanced Encryption Standard Cipher Block Chaining (AES-CBC).

2. The method of claim 1, further comprising performing re-encryption utilising a block cipher mode of operation.

3. The method of claim 1, further comprising: receiving the user password;
reading the stored re-encrypted blob;
decrypting the re-encrypted blob in a Trusted Execution Environment execution mode of the apparatus;
decrypting the decrypted blob in the Trusted Platform Module utilising a user generated password;
increasing a value of a fail counter if the decrypting is unsuccessful; and
obtaining and storing a derivation key as a result of the decrypting, opening memory storage for use, and resetting the fail counter if the decrypting is successful.

4. The method of claim 3, further comprising:
comparing the value of the fail counter to a given threshold value if the value of the fail counter is increased; and
deleting contents of the memory storage if the value of the fail counter is larger than the given threshold value.

5. The method of claim 1, wherein the random number comprises 32 bytes.

6. The method of claim 1, further comprising receiving the user password from a user of the apparatus via a user interface.

7. A mobile terminal apparatus comprising: a trusted platform module (TPM);
a processor comprising an open execution mode and a Trusted Execution Environment (TEE) execution mode; and
a memory storage; wherein the processor is in the open execution mode configured to perform operations comprising:
receiving a user password;
requesting a random number from Trusted Platform Module (TPM); receiving apparatus specific values of one or more Platform Configuration Registers of the Trusted Platform Module;
creating a blob using the random number and the apparatus specific values from the one or more registers and the user password;
requesting the Trusted Platform Module to encrypt the blob;
requesting the Trusted Execution Environment execution mode of the processor to re-encrypt the encrypted blob utilizing a hardware specific key and the user password; and
storing the re-encrypted blob, wherein the processor is in a restricted privilege execution mode configured to perform operations comprising:
generating a salt utilising the encrypted blob;
applying a Secure Hash Algorithm (PBDKF-SHA256) to the salt;
generating an Advanced Encryption Standard key utilising the salt and the hardware specific key; and
encrypting the hardware specific key utilising Advanced Encryption Standard Cipher Block Chaining (AES-CBC).

8. The apparatus of claim 7, wherein the processor is in the Trusted Execution Environment execution mode configured to perform re-encryption utilising a block cipher mode of operation.

9. The apparatus of claim 8, wherein the processor is in the open execution mode further configured to perform operations comprising:
receiving the user password;
reading the stored re-encrypted blob;
requesting the Trusted Execution Environment execution mode of the processor to decrypt the re-encrypted blob;
requesting the Trusted Platform Module to decrypt the decrypted blob utilising a user generated password;
increasing a value of a fail counter if the decrypting is unsuccessful; and
obtaining and storing a derivation key as a result of the decrypting, opening memory storage for use, and resetting the fail counter if the decrypting is successful.

10. The apparatus of claim 9, wherein the processor is in the open execution mode, if the value of the fail counter is increased, and is further configured to perform operations comprising:
comparing the value of the fail counter to a given threshold value; and
deleting contents of the memory storage if the value of the fail counter is larger than the given threshold value.

11. A computer-readable device comprising program instructions which, when executed by a mobile terminal apparatus, are configured to control the electronic apparatus to perform operations comprising:
receiving a user password;
reading a random number from Trusted Platform Module (TPM);
receiving apparatus specific values of one or more Platform Configuration Registers of the Trusted Platform Module;
creating a blob using the random number and the apparatus specific values from the one or more registers and the user password;

encrypting the blob in the Trusted Platform Module;
re-encrypting the encrypted blob in a Trusted Execution Environment (TEE) execution mode of the apparatus utilizing hardware specific key and the user password;
storing the re-encrypted blob;
generating a salt utilising the encrypted blob;
applying a Secure Hash Algorithm (PBDKF-SHA256) to the salt;
generating an Advanced Encryption Standard key utilising the salt and the hardware specific key; and
encrypting the hardware specific key utilising Advanced Encryption Standard Cipher Block Chaining (AES-CBC).

\* \* \* \* \*